(12) United States Patent
Ichihara

(10) Patent No.: US 10,845,613 B2
(45) Date of Patent: Nov. 24, 2020

(54) IMAGE PICKUP APPARATUS EXECUTING FUNCTION BASED ON SHAKE, CONTROL METHOD FOR SAME, AND STORAGE MEDIUM STORING CONTROL PROGRAM THEREFOR

(71) Applicant: CANON KABUSHIKI KAISHA, Tokyo (JP)

(72) Inventor: Atsushi Ichihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/432,335

(22) Filed: Jun. 5, 2019

(65) Prior Publication Data
US 2019/0285908 A1    Sep. 19, 2019

Related U.S. Application Data

(63) Continuation of application No. PCT/JP2017/037769, filed on Oct. 12, 2017.

(30) Foreign Application Priority Data

Dec. 16, 2016  (JP) .................................. 2016-244319

(51) Int. Cl.
*G02B 27/64* (2006.01)
*G03B 5/00* (2006.01)
(Continued)

(52) U.S. Cl.
CPC ............. *G02B 27/646* (2013.01); *G03B 5/00* (2013.01); *G03B 17/14* (2013.01); *H04N 5/232* (2013.01);
(Continued)

(58) Field of Classification Search
None
See application file for complete search history.

(56) References Cited

U.S. PATENT DOCUMENTS 5,852,749 A     12/1998   Konno et al.
2010/0272423 A1  10/2010  Ohara
(Continued)

FOREIGN PATENT DOCUMENTS

JP     H07159833 A    6/1995
JP     H0980549 A     3/1997
(Continued)

OTHER PUBLICATIONS

International Search Report issued in Intl. Appln. No. PCT/JP2017/037769 dated Jan. 16, 2018. English translation provided.
(Continued)

*Primary Examiner* — William B Perkey
(74) *Attorney, Agent, or Firm* — Rossi, Kimms & McDowell LLP

(57) ABSTRACT

An image pickup apparatus includes a detector configured to detect a shake of the image pickup apparatus, at least one processor and at least one memory functioning as an acquisition unit configured to acquire driving frequency information on an accessory attached to the image pickup apparatus, and a control unit configured to control a function using a detection result of the detection unit. The control unit controls the function based on the driving frequency information acquired by the acquisition unit.

20 Claims, 8 Drawing Sheets

(51) Int. Cl.
    *G03B 17/14* (2006.01)
    *H04N 5/232* (2006.01)
(52) U.S. Cl.
    CPC . *H04N 5/23258* (2013.01); *G03B 2205/0015*
    (2013.01)

(56) References Cited

U.S. PATENT DOCUMENTS

2017/0052429 A1* 2/2017 Miyajima ............. H02P 25/032
2019/0258908 A1* 8/2019 Shindo ............... G06K 15/1881

FOREIGN PATENT DOCUMENTS

| JP | 2007304456 A | 11/2007 |
| JP | 2010273335 A | 12/2010 |
| JP | 2016048289 A | 4/2016 |

OTHER PUBLICATIONS

Written Opinion issued in Intl. Appln. No. PCT/JP2017/037769 dated Jan. 16, 2018.

* cited by examiner

FIG. 5

| CORRECTION DIRECTION | NON-INTERFERING LENS | | INTERFERING LENS | |
|---|---|---|---|---|
| | IS COMPATIBLE LENS | IS NON-COMPATIBLE LENS | IS COMPATIBLE LENS | IS NON-COMPATIBLE LENS |
| Pitch | PERMISSION (CORRECTION ON LENS SIDE) | PERMISSION (CORRECTION INSIDE CAMERA) | PERMISSION (CORRECTION ON LENS SIDE) | PROHIBITION OR RESTRICTION (CORRECTION INSIDE CAMERA) |
| Yaw | PERMISSION (CORRECTION ON LENS SIDE) | PERMISSION (CORRECTION INSIDE CAMERA) | PERMISSION (CORRECTION ON LENS SIDE) | PROHIBITION OR RESTRICTION (CORRECTION INSIDE CAMERA) |
| Roll | PERMISSION (CORRECTION INSIDE CAMERA) | PERMISSION (CORRECTION INSIDE CAMERA) | PROHIBITION OR RESTRICTION (CORRECTION INSIDE CAMERA) | PROHIBITION OR RESTRICTION (CORRECTION INSIDE CAMERA) |

*FIG. 6*

| SETTING OF DEGREE OF FLOW | NON-INTERFERING LENS | INTERFERING LENS |
|---|---|---|
| HIGH | HANDLE | NOT HANDLE |
| STANDARD: INTERMEDIATE | HANDLE | HANDLE |
| LOW | HANDLE | NOT HANDLE |

IMAGE PICKUP APPARATUS EXECUTING FUNCTION BASED ON SHAKE, CONTROL METHOD FOR SAME, AND STORAGE MEDIUM STORING CONTROL PROGRAM THEREFOR

CROSS-REFERENCE TO RELATED APPLICATIONS

This application is a Continuation of International Patent Application No. PCT/JP2017/037769, filed Oct. 12, 2017, which claims the benefit of Japanese Patent Application No. 2016-244319, filed Dec. 16, 2016, both of which are hereby incorporated by reference herein in their entirety.

BACKGROUND OF THE INVENTION

Field of the Invention

The present invention relates to an image pickup apparatus or the like to which an accessory such as an interchangeable lens can be detachably attached and which executes a function based on a shake.

Background Art

Conventionally, there has been known an image pickup apparatus such as a camera that detects a shake of an image pickup apparatus body and executes a function such as an image shake correction based on the detected shake among image pickup apparatuses to which an accessory such as an interchangeable lens can be detachably attached. For example, in a typical image pickup apparatus having a function of correcting an image shake caused by a camera shake, a shake detection sensor such as an angular velocity sensor is used for detection of the amount of the camera shake. A part or all of a pickup optical system is driven to perform the image shake correction on an image formation plane based on the detected shake.

Meanwhile, the image pickup apparatus has various vibration sources such as a mirror, a shutter drive part, an ultrasonic motor that performs focus control of a lens, and a stepping motor. Since the shake detection sensor has extremely high sensitivity, when a vibration is generated by the vibration source in a period close to a driving frequency of the shake detection sensor, the shake detection sensor receives interference of the vibration. Then, a noise component generated by the interference is superimposed on an output of the shake detection sensor so that there is a problem that it is difficult to perform the appropriate image shake correction. Therefore, in Patent Literature 1, when an image pickup apparatus changes a reading frequency of an image pickup part and a driving frequency of the drive part, the driving frequency of the shake detection sensor is changed to cause the sensor to avoid receiving the interference with the vibration or noise generated in the image pickup apparatus.

CITATION LIST

Patent Literature

Patent Literature 1: Japanese Laid-Open Patent Publication (kokai) No. 2016-048289

However, when an accessory such as an interchangeable lens and an external strobe is attached to the image pickup apparatus, drive parts of these accessories are driven with a unique driving frequency that is hardly controlled by the image pickup apparatus. Thus, there is a case where the shake detection sensor in the image pickup apparatus interferes with the vibration generated by the attached accessory. That is, if the driving frequency of the drive part in the accessory and the driving frequency of the shake detection sensor interfere with each other, it is difficult to perform the appropriate correction, and there is a possibility of miscorrection or overcorrection. In addition, even when the function such as the shake correction is executed based on the output of the shake detection sensor in the state where the driving frequency of the drive part of the accessory is unknown on the image pickup apparatus side, there is a risk that the function is not appropriately executed due to the interference.

SUMMARY OF THE INVENTION

An object of the present invention is to avoid inappropriate execution of a function using a result of shake detection due to frequency information on an accessory.

In order to achieve the above-mentioned purpose, an image pickup apparatus includes a detector configured to detect a shake of the image pickup apparatus, at least one processor and at least one memory functioning as an acquisition unit configured to acquire driving frequency information on an accessory attached to the image pickup apparatus and a control unit configured to control a function using a detection result of the detection unit, wherein the control unit controls the function based on the driving frequency information acquired by the acquisition unit.

Further features of the present invention will become apparent from the following description of exemplary embodiments (with reference to the attached drawings).

BRIEF DESCRIPTION OF THE DRAWINGS

FIG. 5 is a diagram showing a control mode of an image shake correction function depending on presence or absence of interference in a driving frequency.

FIG. 6 is a diagram showing a control mode of a panning shooting function depending on presence or absence of interference in the driving frequency.

DESCRIPTION OF THE EMBODIMENTS

Embodiments of the present invention will be described below with reference to the drawings.

First Embodiment

Figure 1:
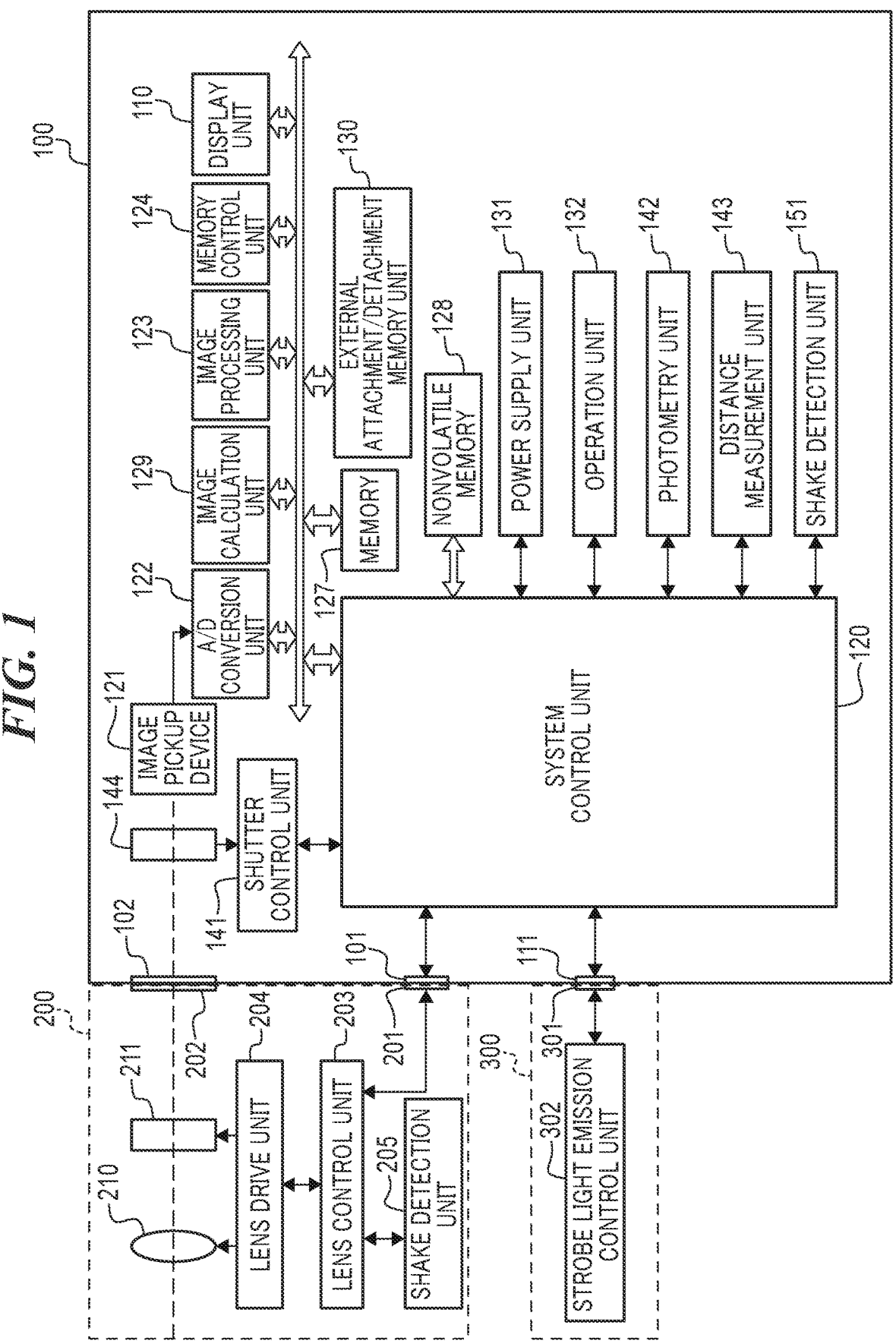
FIG. 1 is a block diagram of a camera system including an image pickup apparatus.

FIG. 1 is a block diagram of a camera system including an image pickup apparatus according to the first embodiment of the present invention. This camera system is configured by attaching a lens unit 200, which is a detachably-attached interchangeable lens, to an image pickup apparatus 100.

In the image pickup apparatus 100, an optical image of an object (not shown) is formed on an image pickup device 121 via a lens 210, an aperture 211, lens mounts 102 and 202, and a shutter 144, and this optical image is converted to an electrical signal. An A/D conversion unit 122 converts an analog signal, which is an output of the image pickup device 121, into a digital signal. The digital signal A/D-converted by the A/D conversion unit 122 is controlled by a memory control unit 124 and a system control unit 120 and stored in a memory 127.

An image processing unit 123 performs predetermined pixel interpolation processing and color conversion processing on data of the digital signal A/D-converted by the A/D conversion unit 122. The image processing unit 123 also includes a compression/decompression circuit that compresses and decompresses image data by adaptive discrete cosine transformation (ADCT) or the like. The image processing unit 123 can also read an image stored in the memory 127, perform compression processing or expansion processing, and write the processed data in the memory 127. An image calculation unit 129 can calculate a contrast value of a pickup image and measure an in-focus state of a shot image from the contrast value, and also can calculate a correlation value between image data stored in the memory 127 and the current pickup image and search for a area with the highest correlation.

The memory control unit 124 controls transmission and reception of data between the A/D conversion unit 122, the image processing unit 123, a display device 110, and an external attachment/detachment memory unit 130, and the memory 127. The data of the A/D conversion unit 122 is written in the memory 127 via the image processing unit 123. The display device 110 is constituted by a liquid crystal panel display unit (not shown) and a backlight illumination unit and enables live view shooting by sequentially displaying through images of pickup data obtained from the image pickup device 121 in real time. It enables to display an AF frame indicating an AF area to be superimposed on an image on the display device 110 such that a user can recognize a position of an object of an AF target during the live view shooting.

The system control unit 120 controls the entire image pickup apparatus 100 and can control the lens unit 200 by controlling a lens control unit 203 via interfaces 101 and 201. The memory 127 can store data of shot still images and moving image, and an image for playback display. It should be noted that a program stack area, a status storage area, a calculation area, a work area, and an image display data area of the system control unit 120 are secured in the memory 127. Various calculations are executed by the system control unit 120 using the calculation area of the memory 127.

A nonvolatile memory 128 is an electrically erasable/recordable memory, and a flash memory, an EEPROM, or the like, for example, are used. Information indicating a shooting state, a program for controlling the image pickup apparatus 100, and the like are stored in the nonvolatile memory 128. The external attachment/detachment memory unit 130 records and reads an image file on a recording medium such as a compact flash (registered trademark) and an SD card. A power supply unit 131 is constituted by a battery, a battery detection circuit, a DC-DC converter, a switch circuit that switches a block to be energized, and the like, and detects presence or absence of the battery, a type of the battery, and a remaining battery level. In addition, the power supply unit 131 controls the DC-DC converter based on a detection result and an instruction of the system control unit 120, and supplies a necessary voltage to each block unit for a necessary period.

A shutter control unit 141 controls the shutter 144 in cooperation with the lens control unit 203 that controls the aperture 211 based on photometric information from a photometry unit 142. The photometry unit 142 performs AE (automatic exposure) processing. Light beams which enter the lens 210 are incident on the photometry unit 142 through the aperture 211, the lens mounts 202 and 102, and further, a photometry lens (not shown), whereby an exposure state of an image formed as an optical image can be measured. In addition, the photometry unit 142 also has an EF (electronic flash light modulation) processing function by cooperating with a strobe unit 300. In addition, the strobe unit 300 also has a function of projecting AF auxiliary light and a flash light control function.

Figure 3:
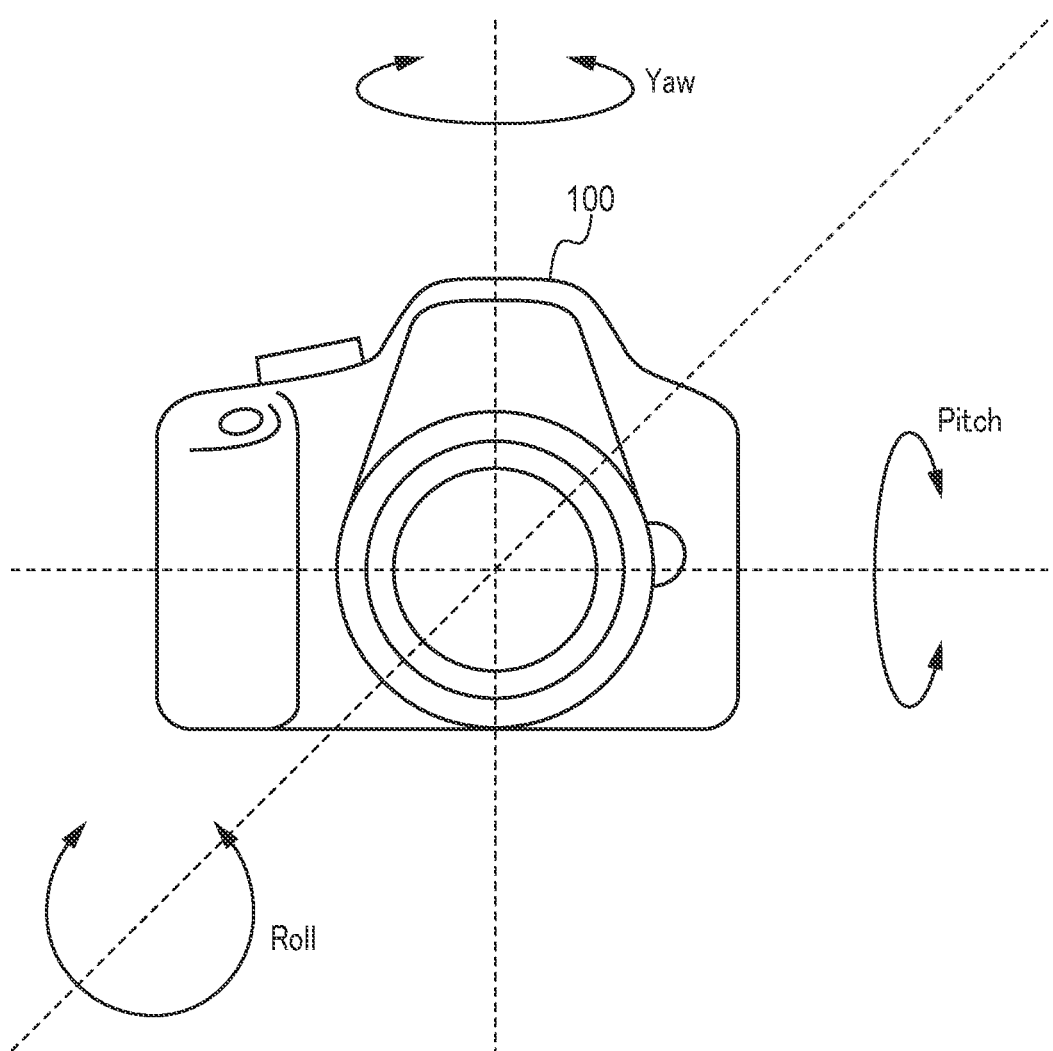
FIG. 3 is a diagram for describing a correction direction in an image shake correction.

A distance measurement unit 143 performs AF processing. Light beams which enter the lens 210 are incident on the distance measurement unit 143 through the aperture 211, the lens mounts 202 and 102, and further, a distance measurement mirror (not shown), whereby an in-focus state of an image formed as an optical image can be measured. It should be noted that the distance measurement unit 143 can also measure an in-focus state of the shot image based on a contrast value obtained from image data output from the image calculation unit 129 during the live view shooting. The shutter 144 shields the image pickup device 121 from light at the time of non-shooting, and opens to guide light beams to the image pickup device 121 at the time of shooting. An operation unit 132 is an operation unit configured to input various operation instructions of the system control unit 120. The operation unit 132 is configured using a combination of each one or a plurality of a switch, a dial, a pointing device using line-of-sight detection, a voice recognition device, or the like. A shake detection unit 151 is configured using, for example, an angular velocity sensor or the like, and is a detection method that detects the amount of vibration inside the image pickup apparatus 100. As shown in FIG. 3, the shake detection unit 151 can detect vibrations in three axial directions, a pitch direction, a yaw direction, and a roll direction.

The lens mount 102 and the lens mount 202 are mechanical holding mechanisms configured to connect the image pickup apparatus 100 to the lens unit 200. The lens mounts 102 and 202 have connection terminals that electrically connect the image pickup apparatus 100 to the lens unit 200, and the system control unit 120 communicates with the lens control unit 203 via the connection terminals. Accessory shoes 111 and 301 are interfaces configured to connect the strobe unit 300 to the image pickup apparatus 100. The lens unit 200 can guide an optical image of an object (not shown) from the lens 210 through the aperture 211, the lens mounts 202 and 102, and the shutter 144 such that an image is formed on the image pickup device 121.

The lens control unit 203 controls the entire lens unit 200. The lens control unit 203 also has a function of a nonvolatile memory. In this nonvolatile memory, a constant and a variable for operation, identification information (a lens ID) such as a number unique to a memory storing a program or the like or the lens unit 200, management information, functional information such as an open aperture value, a minimum aperture value, and a focal length, and current and past setting values are stored. Further, "frequency information" indicating a driving frequency or the like of the lens drive unit 204 is held in the nonvolatile memory of the lens control unit 203. The lens control unit 203 controls focusing of the lens 210 based on the in-focus state of the image measured by the distance measurement unit 143 or the image processing unit 123, and performs an AF operation by changing an image forming position of an object image incident on the image pickup device 121. In addition, the lens control unit 203 also has functions of controlling the aperture 211 and controlling zooming of the lens 210.

The lens drive unit 204 drives the lens 210 and the aperture 211. The lens drive unit 204 receives a focusing control signal, a zooming control signal, and an image shake correction control signal from the lens control unit 203 and drives the lens 210. Further, the lens drive unit 204 receives an aperture control signal and drives the aperture 211. The lens drive unit 204 includes the above-described focusing control mechanism, zooming control mechanism, image shake correction control mechanism, and aperture control mechanism. The shake detection unit 205 is configured using, for example, a gyro sensor or the like, and detects the amount of vibration inside the lens unit 200. The shake detection unit 205 can detect vibrations in two axial directions of the pitch direction and the yaw direction among the pitch direction, the yaw direction, and the roll direction.

The strobe unit 300 can be connected to the accessory shoe 111. In the accessory shoe 111, the interface 301 is electrically connected to the strobe unit 300 and the image pickup apparatus 100. A strobe light emission control unit 302 controls the entire strobe unit 300 and controls a light emission amount and a light emission timing on a light emission unit such as a xenon tube (not shown) based on information from the photometry unit 142.

In the present embodiment, image shake correction and panning shooting functions are exemplified as functions realized by the system control unit 120 using a detection result of the shake detection unit 151. The panning shooting function is a function in which shooting is performed while following movement of a moving object, and enables shooting with the flowing background and a suppressed blur of the object by applying the image shake correction function. As described in detail in FIGS. 2 to 6, the system control unit 120 acquires frequency information of the lens unit 200, and controls the above-described function based on the acquired frequency information. Specifically, a control mode of the image shake correction of the image pickup apparatus 100 is changed based on the frequency information of the attached lens unit 200.

Figure 2:
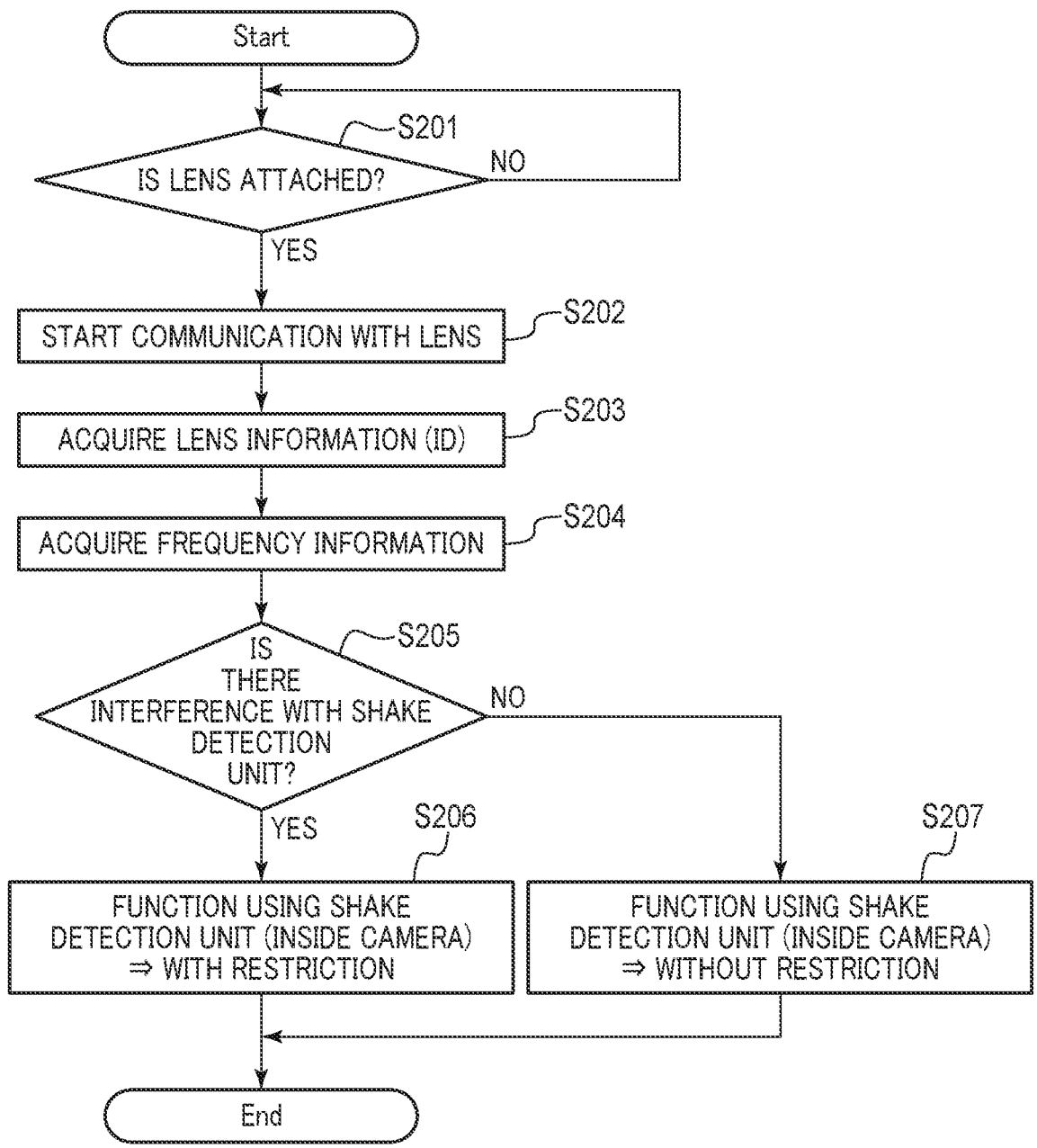
FIG. 2 is a flowchart of functional control processing.

FIG. 2 is a flowchart of a functional control process. The process of this flowchart is realized as the system control unit 120 loads the program stored in the nonvolatile memory 128 on the memory 127 and executes the program. This process is started when the operation unit 132 is operated when the power supply of the image pickup apparatus 100 is turned on or in an on-state. In this process, the system control unit 120 corresponds to a control method and an acquisition method in the present invention.

First, in step S201, the system control unit 120 determines whether the lens unit 200 is attached to the image pickup apparatus 100 via the lens mounts 202 and 102, and continues the determination until the lens unit 200 is attached. Further, when the lens unit 200 is attached, the system control unit 120 starts communication with the lens control unit 203 of the attached lens unit 200 in step S202. In step S203, the system control unit 120 acquires lens information to identify the attached lens unit 200 from the lens control unit 203 by communication. This lens information includes, for example, a lens ID, optical correction value information unique to a lens, and the like. In step S204, the system control unit 120 acquires frequency information indicating the driving frequency of the lens drive unit 204 by communication.

In step S205, the system control unit 120 determines whether a driving frequency of the lens drive unit 204 indicated by the frequency information acquired in step S204 and a driving frequency of the shake detection unit 151 inside the image pickup apparatus 100 interfere with each other. For example, when a ratio or a difference between both the driving frequencies is within a predetermined range, it is determined that both the driving frequencies interfere with each other. As a result of the determination, the process proceeds to step S207 when there is no interference in the driving frequency between both the lens drive unit 204 and the shake detection unit 151, and the process proceeds to step S206 when there is the interference in the driving frequency therebetween. The process of FIG. 2 is ended after steps S206 and S207.

In step S207, the system control unit 120 performs control as usual without any prohibition or restriction on the function using the shake detection unit 151 such as the image shake correction function and the panning shooting function. On the other hand, the system control unit 120 imposes a restriction such as a prohibition on the function using the shake detection unit 151 in step S206.

Here, processing with respect to the image shake correction function among the functions using the shake detection unit 151 will be described. FIG. 3 is a diagram for describing a correction direction in the image shake correction of the image pickup apparatus 100. Vibration directions of a camera shake or the like detected by the shake detection unit 151 include the three axial directions orthogonal to each other, which are, the pitch direction, the yaw direction, and the roll direction with respect to the image pickup apparatus 100. The roll direction is a direction around a shooting optical axis (direction in which an image pickup plane rotates within a plane perpendicular to the optical axis). The pitch direction is an inclination direction (tilting direction) with respect to a horizontal plane. The yaw direction is an inclination direction (panning direction) with respect to a vertical plane. These directions are orthogonal to each other.

For the image shake correction function, lens anti-vibration (optical correction), sensor anti-vibration (optical correction), and electronic anti-vibration (movement of a reading range) may be adopted. For example, the image shake correction function of the image pickup apparatus 100 is realized by an optical correction performed by the lens control unit 203 or an electronic correction performed by the system control unit 120 on a shot image read by the image pickup device 121 in response to the detected vibrations in the above-described respective directions. The optical correction performed by the lens control unit 203 can be performed in the pitch direction and the yaw direction. The electronic correction performed by the system control unit 120 is usually performed in the roll direction. It should be noted that some of the lens units 200 do not have a mechanism for performing the optical correction. When such a lens unit 200 is attached, the system control unit 120 electronically performs the correction not only in the roll direction but also in the pitch direction and in the yaw direction.

Figure 4A:
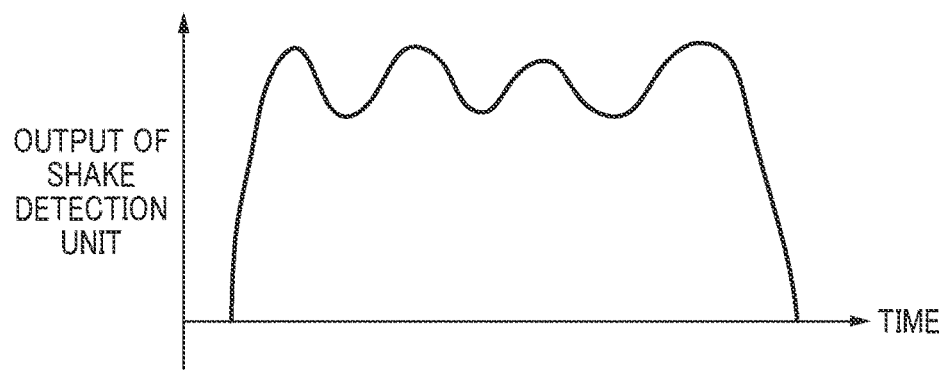
FIGS. 4A and 4B are diagrams showing a detected vibration amount and a correction amount for correcting an image shake.
Figure 4B:
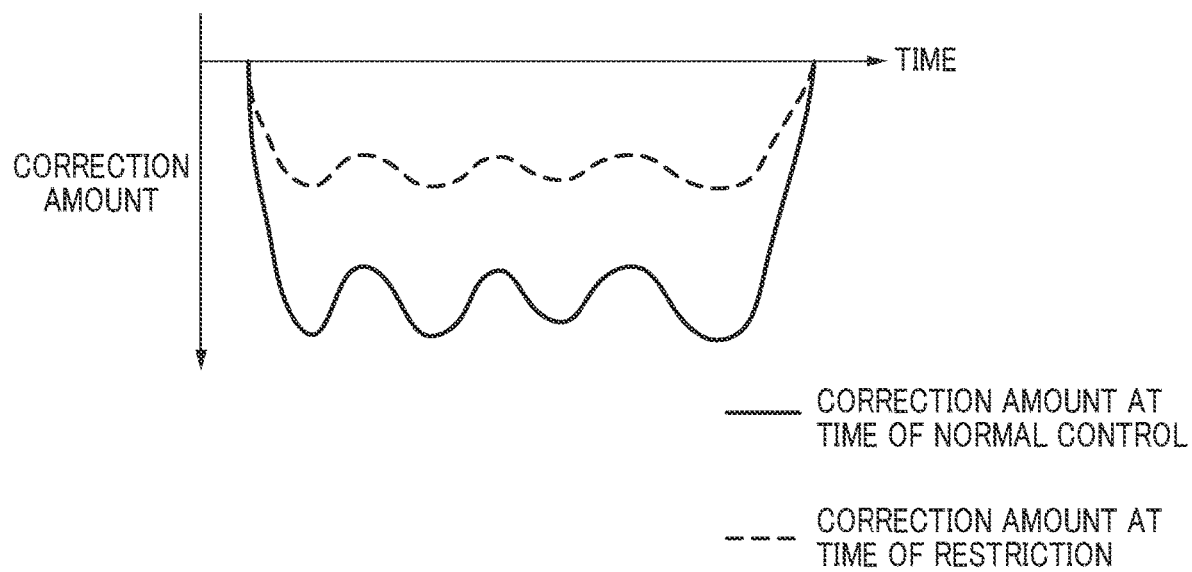

FIG. 4A is a diagram showing a detected vibration amount. FIG. 4B is a diagram showing a correction amount for correcting an image shake corresponding to a vibration amount. The output of the shake detection unit 151 will be described here although the vibration amount shown in FIG. 4A may be either an output of the shake detection unit 151 of the image pickup apparatus 100 or an output of the shake detection unit 205 of the lens unit 200. In addition, the system control unit 120 will be described here although either the system control unit 120 or the lens control unit 203 may be the main body that performs the shake correction.

The shake detection unit 151 detects a vibration and transmits the amount of the vibration which is a result of the detection to the system control unit 120 as an analog signal or digital data. The system control unit 120 calculates a correction amount from the received data on the vibration amount. For example, when calculation is simply performed to cancel the vibration without restricting the image shake correction function, the system control unit 120 calculates a correction amount at the time of normal control obtained by inverting the vibration amount in FIG. 4A as shown by the solid line in FIG. 4B and controls the image shake correction function. In addition, when restricting the image shake correction function, the system control unit 120 calculates a correction amount at the time of the restriction obtained by halving the correction amount at the normal time as shown by the dotted line in FIG. 4B, and controls the image shake correction function.

Regarding the control of the image shake correction function, the system control unit 120 permits corrections in all the three directions shown in FIG. 3, for example, in step S207 of FIG. 2. In the restriction on the function in step S206, the correction amount is decreased (for example, halved) as indicated by the dotted line in FIG. 4B, for example. Alternatively, the correction amount is set to zero or the image shake correction function itself is not performed (prohibited).

FIG. 5 is a diagram showing a control mode of the image shake correction function depending on presence or absence of interference in the driving frequency between the lens drive unit 204 and the shake detection unit 151. The mode of permitting or prohibiting the image shake correction function differs between an "interfering lens" having the lens drive unit 204 which interferes with the driving frequency of the shake detection unit 151 and a "non-interfering lens" which does not interfere with the driving frequency of the shake detection unit 151. In addition, the mode of permitting or prohibiting the image shake correction function also differs depending on whether the lens unit 200 has the image shake correction function (is an IS compatible lens) or not, and further, depending on a direction of a shake.

Specifically, with respect to the non-interfering lens, the system control unit 120 permits the image shake correction function in the three directions using the image pickup apparatus 100 without any prohibition or restriction similarly to the related art. In addition, the system control unit 120 permits corrections in the pitch direction and in the yaw direction using the lens control unit 203 with respect to the lens unit 200 which is the non-interfering lens and has the image shake correction function. On the other hand, with respect to the interfering lens, the system control unit 120 prohibits or restricts the image shake correction function in the three directions using the image pickup apparatus 100. Here, the corrections in the pitch direction and in the yaw direction performed by the lens control unit 203 based on the detection result of the shake detection unit 205 are not affected by the above-described interference. Therefore, the system control unit 120 permits the shake corrections in the pitch direction and in the yaw direction using the lens control unit 203 with respect to the lens unit 200 which is the interfering lens and has the image shake correction function. Thus, the optical corrections performed by the lens control unit 203 in the pitch direction and in the yaw direction are permitted without being restricted.

In addition, control of the panning shooting function is performed as follows. FIG. 6 is a diagram showing a control mode of the panning shooting function depending on presence or absence of interference in the driving frequency. The mode of permitting or prohibiting the panning shooting function differs between the interfering lens and the non-interfering lens. In the panning shooting, an image shake is corrected based on a difference amount between the panning angular velocity of the image pickup apparatus 100 detected by the shake detection unit 151 and the angular velocity of an object acquired from a shot image by the system control unit 120. The system control unit 120 enables appropriate background flow by controlling the shutter speed in accordance with a degree of flow of the background based on the panning angular velocity and a movement amount of the object. In general, the degree of the background flow can be set in three levels, for example, as shown in FIG. 6 in accordance with user's preference. That is, there are three applicable modes where the degree of the background flow is "high", "standard: intermediate", "low". As a setting screen is displayed on the display device 110, the user can also set the degree of the background flow.

Regarding the control of the panning shooting function, the system control unit 120 sets (permits) all the three modes to be applicable without any prohibition or restriction in the case of the non-interfering lens in the case of the non-interfering lens. Therefore, the setting of the degree of background flow can be handled in the three levels. On the other hand, in the case of the interfering lens, the system control unit 120 imposes a restriction such that the degree of background flow of the panning shooting function handles only to the standard setting. This is because such a reduction of the number of applicable modes avoids cases where it is difficult to obtain an expected flow effect or an opposite case where the flow effect is too large.

It should be noted that, when the lens unit 200 is replaced in a state where the image pickup apparatus 100 is activated, the process of FIG. 2 is started again to restrict the function or cancel the restriction in accordance with the new lens unit 200.

In this manner, the system control unit 120 prohibits or restricts the function using the detection result of the shake detection unit 151 when the driving frequency of the lens drive unit 204 interferes with the driving frequency of the shake detection unit 151. As a result, it enables to suppress the influence of noise due to the vibration received from the lens unit 200.

According to the present embodiment, the function using the detection result of the shake detection unit 151 is controlled based on the frequency information acquired from the attached lens unit 200. As a result, it enables to avoid inappropriate execution of the above function due to the frequency information on the lens unit 200. In particular, the above function is prohibited or restricted when there is interference between the driving frequency of the lens drive unit 204 and the driving frequency of the shake detection unit 151, and thus, it enables to avoid miscorrection and overcorrection. On the other hand, when the above interference is absent, the above function is permitted without being inhibited or restricted, and thus, the above function is sufficiently fulfilled by the original control.

In addition, when the image shake correction function is restricted, the correction amount is halved as compared with that of the normal control. Thus, even in the case of miscorrection or overcorrection, the degree thereof can be mitigated. It should be noted that the degree of the correction needs to be just reduced as compared with control in the case of the absence of the above interference from this viewpoint, and it is not limited to the halving. In addition, when the panning shooting function is restricted, the handled setting level of the degree of background flow is set to level one, and thus, it can avoid miscorrection and overcorrection. It should be noted that the number of modes to be applied may be reduced as compared with the control in the case of absence of the above interference when the above function is restricted from this viewpoint.

In addition, even when the image shake correction function in the image pickup apparatus 100 is restricted, the control of the image shake correction function by the lens unit 200 using the detection result of the shake detection unit 205 of the lens unit 200 is permitted. As a result, it does not make the function control by the lens unit 200 be wasted.

Second Embodiment

In the above first embodiment, the system control unit 120 acquired frequency information directly by communication. However, it does not always enable to acquire the frequency information directly by communication. Therefore, in the second embodiment of the present invention, control is divided depending on whether frequency information has been directly acquired by communication. The present embodiment will be described with reference to FIG. 7 instead of FIG. 2 as compared with the first embodiment.

Figure 7:
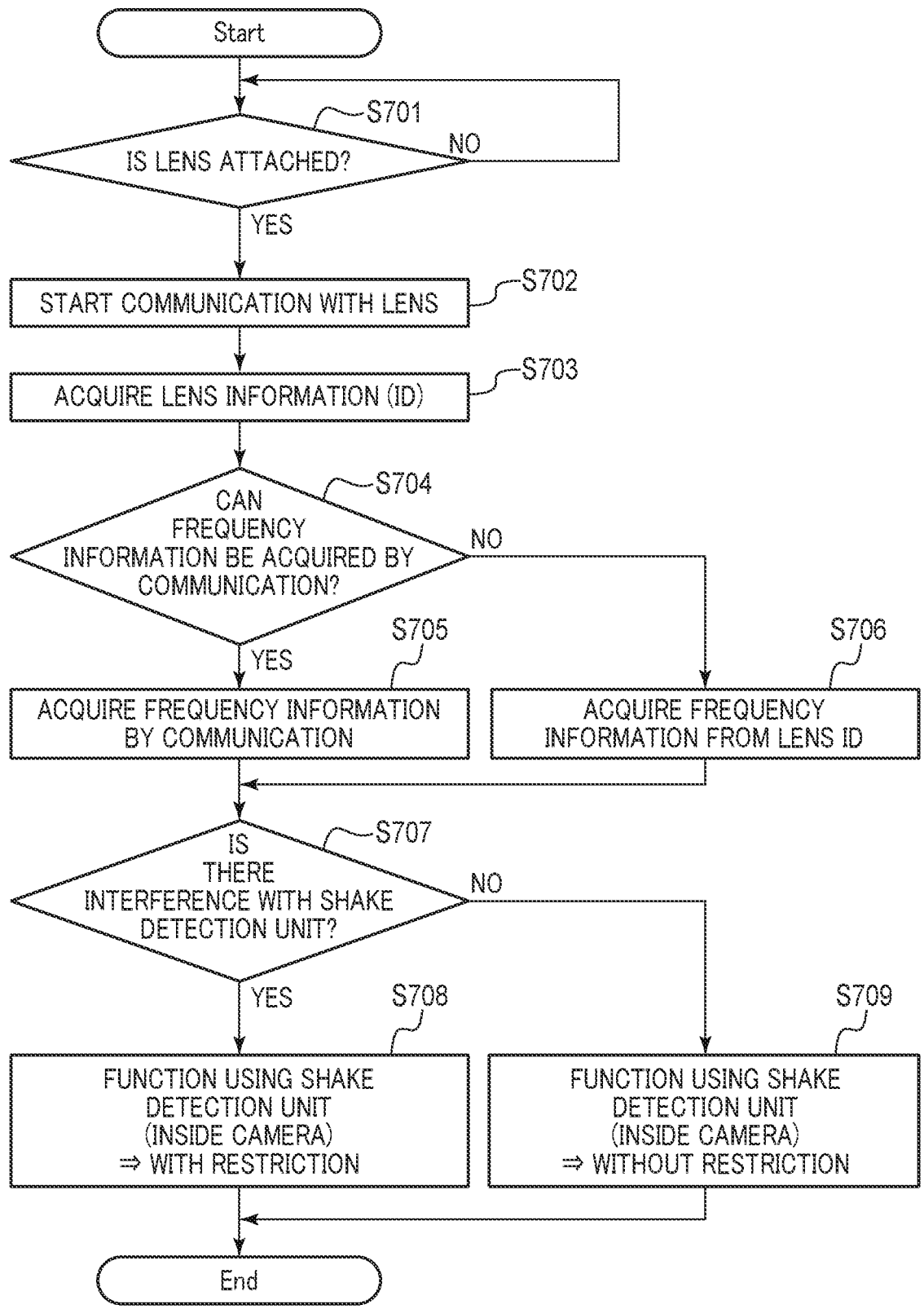
FIG. 7 is a flowchart of functional control processing.

FIG. 7 is a flowchart of a functional control process. A start condition of the process of this flowchart is the same as that of the process of FIG. 2. In steps S701 to S703, the system control unit 120 executes the same process as that in steps S201 to S203 of FIG. 2. However, it is assumed that lens information acquired in step S703 includes information indicating whether a driving frequency of the lens drive unit 204 can be acquired by communication.

In step S704, the system control unit 120 determines whether the driving frequency of the lens drive unit 204 of the attached lens unit 200 can be acquired by communication based on the acquired lens information. Further, the system control unit 120 proceed s to step S705 when determining that the driving frequency can be acquired by communication or proceeds to step S706 when determining that the driving frequency cannot be acquired. In step S705, the system control unit 120 acquires frequency information by communication through the same process as in step S204 of FIG. 2. Then, the process proceeds to step S707.

In step S706, the system control unit 120 acquires frequency information from the image pickup apparatus 100 based on a lens ID of the lens information. Specifically, frequency information associated with the lens ID is stored in the storage unit, for example, the nonvolatile memory 128 in advance. The system control unit 120 acquires frequency information corresponding to the acquired lens ID, as frequency information of the lens drive unit 204 of the attached lens unit 200, among the frequency information stored in the nonvolatile memory 128. As a result, the system control unit 120 can acquire the frequency information of the lens drive unit 204 even in the case of the lens unit 200 in which it cannot acquire the frequency information by communication. Then, the process proceeds to step S707.

In steps S707 to S709, the system control unit 120 executes the same process as that in steps S205 to S207 of FIG. 2, and then, ends the process in FIG. 7.

According to the present embodiment, it enables to achieve the same effect as that of the first embodiment regarding avoidance of inappropriate execution of a function using a detection result of the shake detection unit 151 due to the frequency information on the lens unit 200.

In addition, even when the lens unit 200 in which it cannot acquire frequency information by communication has been attached, it enables to acquire the frequency information thereof. Therefore, this makes it possible to determine whether there is interference with a driving frequency of the shake detection unit 151, as well as to appropriately control the above function.

Third Embodiment

In the above second embodiment, acquiring frequency information without communication is enabled by storing the frequency information in the nonvolatile memory 128. However, because the frequency information stored in the nonvolatile memory 128 is finite and frequency information corresponding to all the lens units 200 from the nonvolatile memory 128 can hardly be acquired. Therefore, in the third embodiment of the present invention, a function of using a detection result of the shake detection unit 151 is prohibited or restricted when frequency information has not been acquired as a result. The present embodiment will be described with reference to FIG. 8 instead of FIG. 7 as compared with the second embodiment. A fact that frequency information associated with a lens ID is stored in the storage unit, for example, the nonvolatile memory 128 in advance is the same as the second embodiment.

Figure 8:
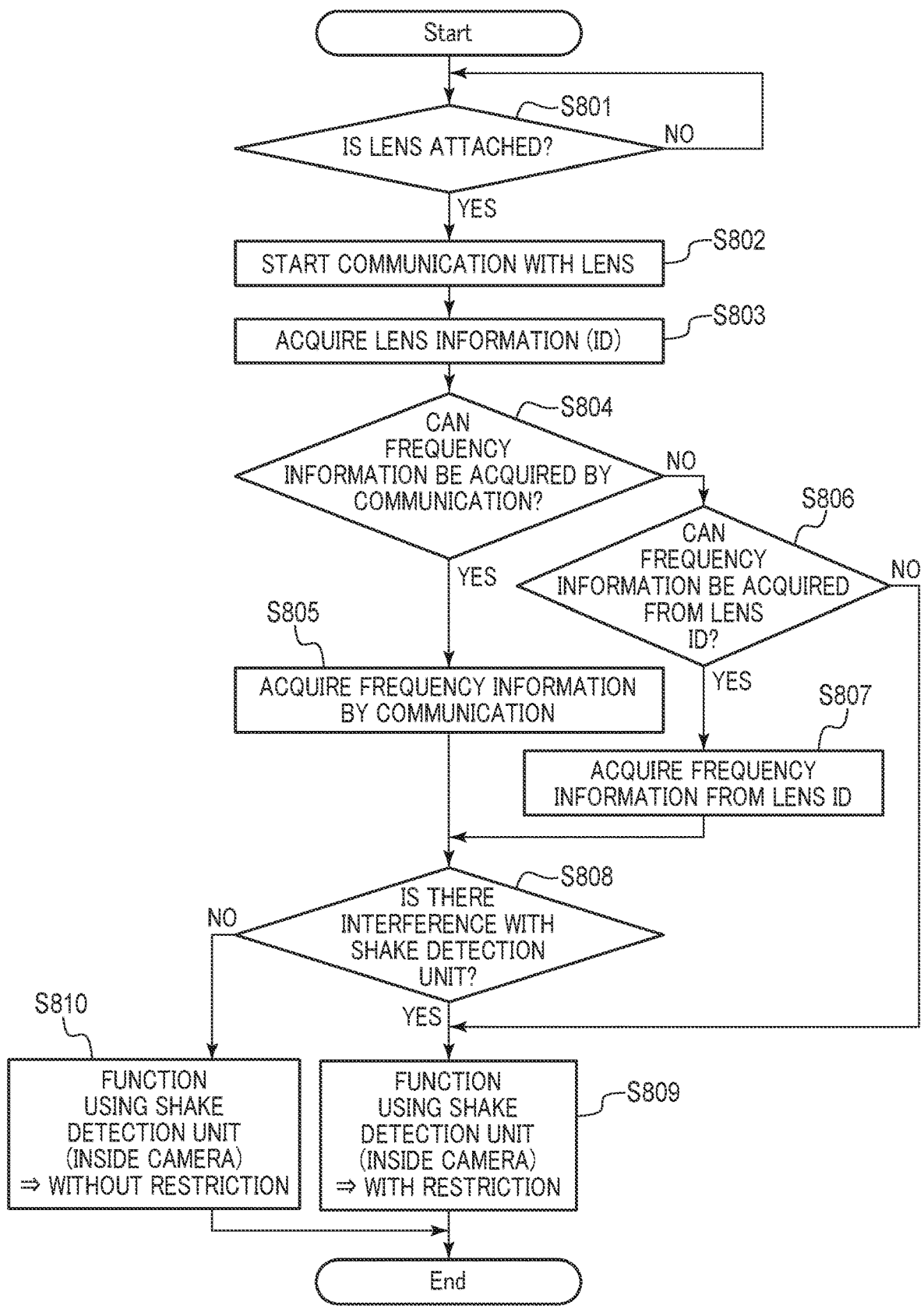
FIG. 8 is a flowchart of functional control processing.

FIG. 8 is a flowchart of a functional control process. A start condition of the process of this flowchart is the same as that of the process of FIG. 7. In steps S801 to S805, the system control unit 120 executes the same process as that in S701 to S705 of FIG. 7. It is assumed that lens information acquired in step S803 includes information indicating whether a driving frequency of the lens drive unit 204 can be acquired by communication.

The system control unit 120 proceeds to step S806 when determining that the driving frequency cannot be acquired by communication as a result of the determination in step S804. In step S806, the system control unit 120 determines whether frequency information can be acquired from the image pickup apparatus 100 based on a lens ID in the lens information. When there is frequency information corresponding to the acquired lens ID among the frequency information stored in the nonvolatile memory 128, the system control unit 120 determines that it is acquirable, and proceeds to step S807 However, when there is no frequency information corresponding to the acquired lens ID among the frequency information stored in the nonvolatile memory 128, the system control unit 120 determines that it is not acquirable, and proceeds to step S809.

In step S807, the system control unit 120 executes the same process as that in step S706 of FIG. 7, and proceeds to step S808. In steps S808 to S810, the system control unit 120 executes the same process as that in steps S707 to S709 of FIG. 7, and then, ends the process in FIG. 8.

When proceeding from step S806 to step S809, a functional restriction is also imposed on the lens unit 200 of which frequency information of the lens drive unit 204 is not stored in the nonvolatile memory 128. When the lens unit 200 to which unidentifiable frequency information has been attached, it is unclear whether the driving frequency of the lens drive unit 204 interferes with a driving frequency of the shake detection unit 151. Thus, it is appropriate to prohibit or restrict the function uniformly in order to avoid miscorrection and overcorrection.

According to the present embodiment, it has the same effect as that of the first embodiment regarding avoidance of inappropriate execution of a function using a detection result of the shake detection unit 151 due to the frequency information on the lens unit 200. In addition, when the frequency information has not been acquired, an inappropriate correction is not executed by prohibiting or limiting the above function.

It should be noted that the value obtained by inverting the output of the shake detection unit 151 is set as the correction amount as a correction method in the example of FIG. 4B, but the calculation method of correction is not limited to the example.

It should be noted that, in the second and third embodiments, the frequency information corresponding to the lens ID is acquired from the nonvolatile memory 128 in step S706 in FIG. 7 and in step S807 in FIG. 8. However, it may be determined in steps S707 or S808 based on the lens ID itself.

It should be noted that the shake detection unit 151, which is the angular velocity sensor, is exemplified as a detection unit that detects the shake of the image pickup apparatus 100 in the above-described respective embodiments, but the detection unit is not limited thereto. For example, it may be configured such that a shake is detected based on a motion vector acquired from a pickup image. In addition, the image shake correction function and the panning shooting function are exemplified as the functions using the detection result of the shake detection unit 151, the functions are not limited thereto.

It should be noted that the driving frequency of the lens drive unit 204 is set as an object to be compared regarding presence or absence of the interference, but any driving frequency can be the object regardless of a continuous driving frequency or an intermittent driving frequency. In addition, the lens unit 200 is exemplified as an accessory to be detachably attached to the image pickup apparatus 100, but the accessory is not limited thereto, and any accessory having a drive unit (for example, a zoom mechanism using the drive unit or an external strobe having a rotation mechanism) can be the object.

Accordingly, it enables to avoid inappropriate execution of the function using the result of shake detection due to the frequency information on the accessory.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus comprising:
   a detector configured to detect a shake of the image pickup apparatus;
   at least one processor and at least one memory functioning as:
      an acquisition unit configured to acquire driving frequency information on an accessory attached to the image pickup apparatus; and
      a control unit configured to control a function using a detection result of the detection unit,
   wherein the control unit controls the function based on the driving frequency information acquired by the acquisition unit, and
   wherein the driving frequency information on the accessory indicates a driving frequency of a drive unit included in the accessory.

2. The image pickup apparatus according to claim 1, wherein the control unit determines presence or absence of interference between the acquired driving frequency information and a driving frequency of the detection unit, and prohibits or restricts the function when the interference between the acquired driving frequency information and the driving frequency of the detection unit is present.

3. The image pickup apparatus according to claim 2, wherein the control unit permits the function without prohibiting or restricting the function when the interference between the acquired driving frequency information and the driving frequency of the detection unit is absent.

4. The image pickup apparatus according to claim 1, wherein the control unit prohibits or restricts the function when the acquisition unit has failed to acquire the driving frequency information.

5. The image pickup apparatus according to claim 2, wherein when restricting the function, the control unit decreases a correction degree based on the detection result of the detection unit as compared to control in a case where the interference between the acquired driving frequency information and the driving frequency of the detection unit is absent.

6. The image pickup apparatus according to claim 2, wherein when restricting the function, the control unit decreases a number of modes to be applied as compared to control in a case where the interference between the acquired driving frequency information and the driving frequency of the detection unit is absent.

7. The image pickup apparatus according to claim 2, wherein even when prohibiting or restricting the function of the image pickup apparatus, the control unit permits the function to be controlled by the accessory using a detection result of a detection unit configured to detect a shake of the accessory included in the accessory.

8. The image pickup apparatus according to claim 1, wherein the acquisition unit acquires the driving frequency information by communication from the attached accessory.

9. The image pickup apparatus according to claim 1, further comprising a storage configured to store at least one driving frequency information,
wherein the acquisition unit acquires identification information to identify the accessory from the attached accessory, and acquires driving frequency information corresponding to the acquired identification information, as driving frequency information on the accessory, among the driving frequency information stored in the storage unit.

10. The image pickup apparatus according to claim 1, wherein the function includes an image shake correction.

11. The image pickup apparatus according to claim 1, wherein the function includes panning shooting in which shooting is performed while following movement of a moving object.

12. The image pickup apparatus according to claim 1, wherein the accessory is an interchangeable lens.

13. A control method for an image pickup apparatus comprising:
detecting a shake of the image pickup apparatus;
acquiring driving frequency information on an accessory attached to the image pickup apparatus; and
controlling a function using a detection result in the detection step,
wherein, in the controlling, the function is controlled based on the driving frequency information acquired in the acquisition step, and
wherein the driving frequency information on the accessory indicates a driving frequency of a drive unit included in the accessory.

14. A computer-readable non-transitory storage medium storing a program that causes a computer to execute a control method for an image pickup apparatus, the control method comprising:
detecting a shake of the image pickup apparatus;
acquiring driving frequency information on an accessory attached to the image pickup apparatus; and
controlling a function using a detection result in the detection step,
wherein, in the controlling, the function is controlled based on the acquired driving frequency information, and
wherein the driving frequency information on the accessory indicates a driving frequency of a drive unit included in the accessory.

15. An image pickup apparatus comprising:
a detector configured to detect a shake of the image pickup apparatus;
at least one processor and at least one memory functioning as:
an acquisition unit configured to acquire driving frequency information on an accessory attached to the image pickup apparatus; and
a control unit configured to control a function using a detection result of the detection unit,
wherein the control unit controls the function based on the driving frequency information acquired by the acquisition unit, and
wherein the acquisition unit acquires the driving frequency information by communication from the attached accessory.

16. A control method for an image pickup apparatus comprising:
detecting a shake of the image pickup apparatus;
acquiring driving frequency information on an accessory attached to the image pickup apparatus; and
controlling a function using a detection result in the detection step,
wherein, in the controlling, the function is controlled based on the acquired driving frequency information, and
wherein, in the acquiring, the driving frequency information is acquired by communication from the attached accessory.

17. A computer-readable non-transitory storage medium storing a program that causes a computer to execute a control method for an image pickup apparatus, the control method comprising:
detecting a shake of the image pickup apparatus;
acquiring driving frequency information on an accessory attached to the image pickup apparatus; and
controlling a function using a detection result in the detection step,
wherein, in the controlling, the function is controlled based on the acquired driving frequency information, and
wherein, in the acquiring, the driving frequency information is acquired by communication from the attached accessory.

18. A lens apparatus detachably attachable to an image pickup apparatus, comprising:
a lens;
a lens driver configured to drive the lens; and
a connection terminal configured to transmit driving frequency information, indicating a driving frequency of the lens driver, to the image pickup apparatus to which the lens apparatus is attached.

19. The lens apparatus according to claim 18, wherein the connection terminal transmits the driving frequency information and identification information, to identify the lens apparatus, to the image pickup apparatus to which the lens apparatus is attached.

20. The lens apparatus according to claim 18, further comprising a memory that stores the driving frequency information.

* * * * *